Figure 1:
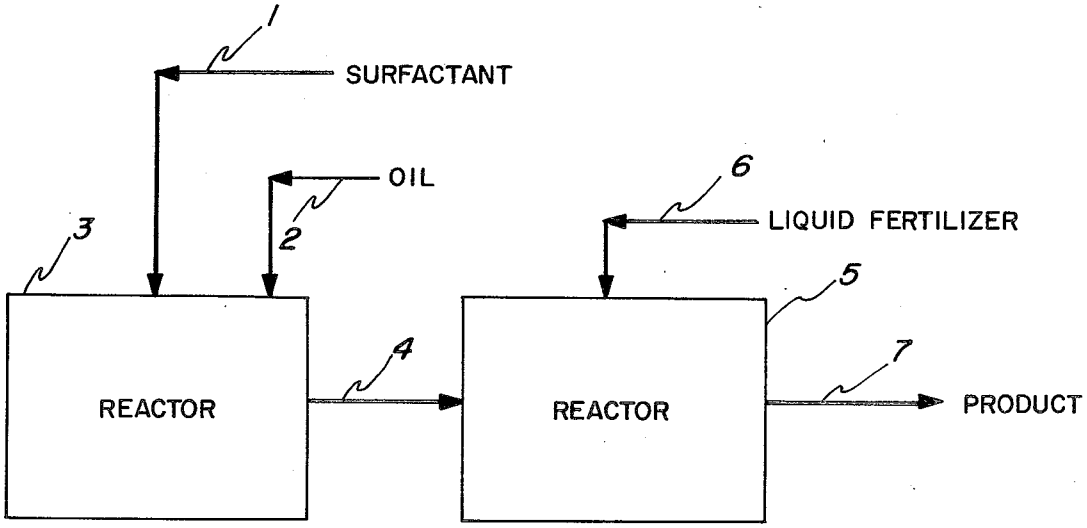
Figure 2:
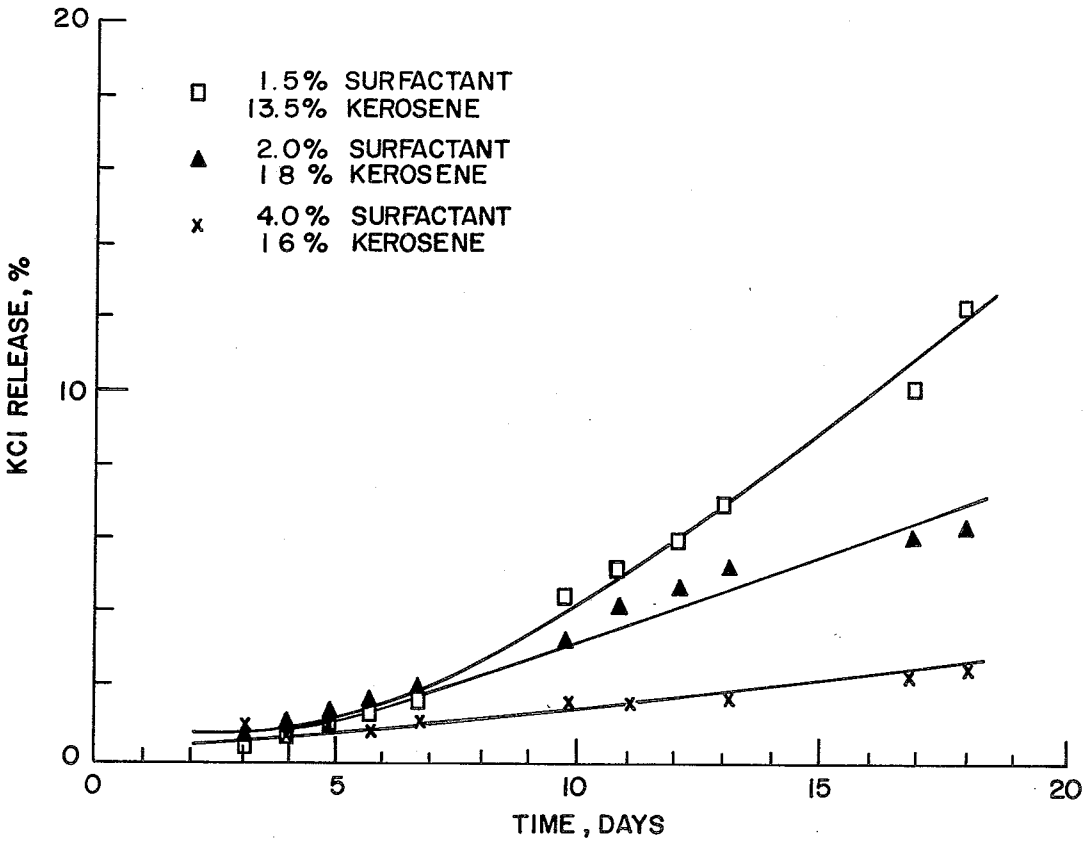

United States Defensive Publication [19] (H) [11] T969,003

Phillips, Jr. et al. [43] Apr. 4, 1978

[54] CONTROLLED RELEASE LIQUID FERTILIZERS

[75] Inventors: John F. Phillips, Jr.; John J. Kohler, both of Florence, Ala.

[73] Assignee: Tennessee Valley Authority, Muscle Shoals, Ala.

[21] Appl. No.: 807,842

[22] Filed: Jun. 20, 1977

[51] Int. Cl.[2] ..... C05G 3/06

[52] U.S. Cl. ..... 71/64 F

[57] ABSTRACT

Liquid fertilizers having controlled release properties are prepared from fertilizer solutions and oil-surfactant mixtures. An invert surfactant is dissolved in an oil such as kerosene. The amount of surfactant used can vary over a wide range. Use of between 0.6 and 1.0 percent surfactant in the fertilizer formulation yields fertilizers with acceptable release rates. Liquid fertilizer is slowly added to the oil-surfactant mixture with vigorous agitation causing a water-in-oil emulsion to form. Mixtures containing 80 to 90 percent liquid fertilizer and 10 to 20 percent oil made excellent products.

The final fertilizer product is an invert emulsion containing 80 to 90 percent liquid fertilizer, 10 to 20 percent oil, and 0.6 to 1.0 percent surfactant. The product consists of small droplets of liquid fertilizer solution surrounded by a thin but essential impenetrable oil-surfactant layer. Water slowly dissolves the surfactant from the oil, thus breaking the emulsion and allowing the liquid fertilizer to be released. Ammonium phosphate, ammonium polyphosphate, ammonium nitrate, potassium chloride, uran solutions, and mixtures thereof, may be used as liquid fertilizers.

5 Claims, 1 Sheet Drawing,

12 Pages Specification

The file of this unexamined application may be inspected and copies thereof may be purchased (849 O.G. 1221, Apr. 9, 1968).

PREPARATION OF SLOW RELEASE LIQUID FERTILIZER

EFFECT OF SURFACTANT AND KEROSENE CONCENTRATION ON POTASSIUM CHLORIDE RELEASE RATE